US011271970B2

(12) United States Patent
Fitz-Gerald, Jr. et al.

(10) Patent No.: US 11,271,970 B2
(45) Date of Patent: Mar. 8, 2022

(54) MULTI-PERSPECTIVE SECURITY CONTEXT PER ACTOR

(71) Applicant: Palo Alto Networks, Santa Clara, CA (US)

(72) Inventors: Jeffrey James Fitz-Gerald, Jr., Campbell, CA (US); Ashwath Sreenivasa Murthy, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 285 days.

(21) Appl. No.: 16/522,632

(22) Filed: Jul. 25, 2019

(65) Prior Publication Data

US 2021/0029165 A1 Jan. 28, 2021

(51) Int. Cl.
H04L 29/06 (2006.01)
(52) U.S. Cl.
CPC .............. *H04L 63/20* (2013.01); *H04L 63/02* (2013.01)
(58) Field of Classification Search
None
See application file for complete search history.

(56) References Cited

U.S. PATENT DOCUMENTS

| | | |
|---|---|---|
| 6,671,695 B2 | 12/2003 | McFadden |
| 6,986,060 B1 | 1/2006 | Wong |
| 10,257,227 B1 * | 4/2019 | Stickle ................... H04L 63/20 |
| 2009/0241167 A1 | 9/2009 | Moore |
| 2013/0097662 A1 * | 4/2013 | Pearcy ................. G06F 21/554 |
| | | 726/1 |

OTHER PUBLICATIONS

PCT Application Serial No. PCT/US2020/042745, International Search Report, dated Oct. 20, 2020, 3 pages.
PCT Application Serial No. PCT/US2020/042745, Written Opinion, dated Oct. 20, 2020, 7 pages.
PCT Application No. PCT/US2020/042745 Written Opinion of the International Preliminary Examining Authority, dated Aug. 4, 2021, 8 pages.

* cited by examiner

*Primary Examiner* — Cai Y Chen
(74) *Attorney, Agent, or Firm* — Gilliam IP PLLC

(57) ABSTRACT

A flexible security system has been created that allows for fluid security operations that adapt to the dynamic nature of user behavior while also allowing the security related operations themselves to be dynamic. This flexible system includes ongoing collection and/or updating of multi-perspective "security contexts" per actor and facilitating consumption of these multi-perspective security contexts for security related operations on the users. These security related operations can include policy-based security enforcement and inspection. A security platform component or security entity uses a multi-perspective security context for a user or actor. Aggregating and maintaining behavioral information into a data structure for an actor over time from different sources allows a security platform component or entity to have historical context for an actor from one or more security perspectives. Descriptors that form a security context can originate from various sources having visibility of user behavior and/or user attributes.

20 Claims, 7 Drawing Sheets

MULTI-PERSPECTIVE SECURITY CONTEXT PER ACTOR

BACKGROUND

The disclosure generally relates to the field of information security, and to multicomputer data transferring.

Groups of users created for an organization or enterprise are often mapped to a directory system. Groups are formed based on organizational descriptors or attributes (i.e., metadata) associated with users having attributes in common. Examples of attributes which can be attached to users include user identity information, location, and cost center. Updates to attributes associated with a user and/or attributes which are associated with groups may be performed by an individual within the context of the organization or enterprise.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to a firewall and an endpoint protection component as detecting events and enforcing security policies in illustrative examples. Aspects of this disclosure can be also applied to other entities and components that have network visibility and/or relate to security. In other instances, well-known instruction instances, protocols, structures and techniques have not been shown in detail in order not to obfuscate the description.

Overview

A flexible security system has been created that allows for fluid security operations that adapt to the dynamic nature of user behavior while also allowing the security related operations themselves to be dynamic. This flexible system includes ongoing collection and/or updating of multi-perspective "security contexts" per user and facilitating consumption of these multi-perspective security contexts for security related operations on the users. These security related operations can include policy-based security enforcement and inspection (e.g., viewing and reporting). A security platform component or security entity uses a multi-perspective security context for a user or actor.

Aggregating and maintaining behavioral information into a data structure for a user or device ("actor") over time from different sources allows a security platform component or entity to have historical context for an actor from one or more security perspectives. This populated structure is formed from one or more descriptors attached or associated with a user. A descriptor describes a behavior or attribute of a user. Thus, a security context is stored information about an actor that includes at least behavioral information based on observed events of the actor and can also include actor attribute information. A descriptor is a unit of this information within the security context and may be a field, object, or other data structure conforming to how the security context is implemented. Descriptors that form a security context can originate from various sources having visibility of user behavior and/or user attributes (e.g., a firewall, security administrator, third party network monitoring application, directory, etc.).

Example Illustrations

Figure 1:
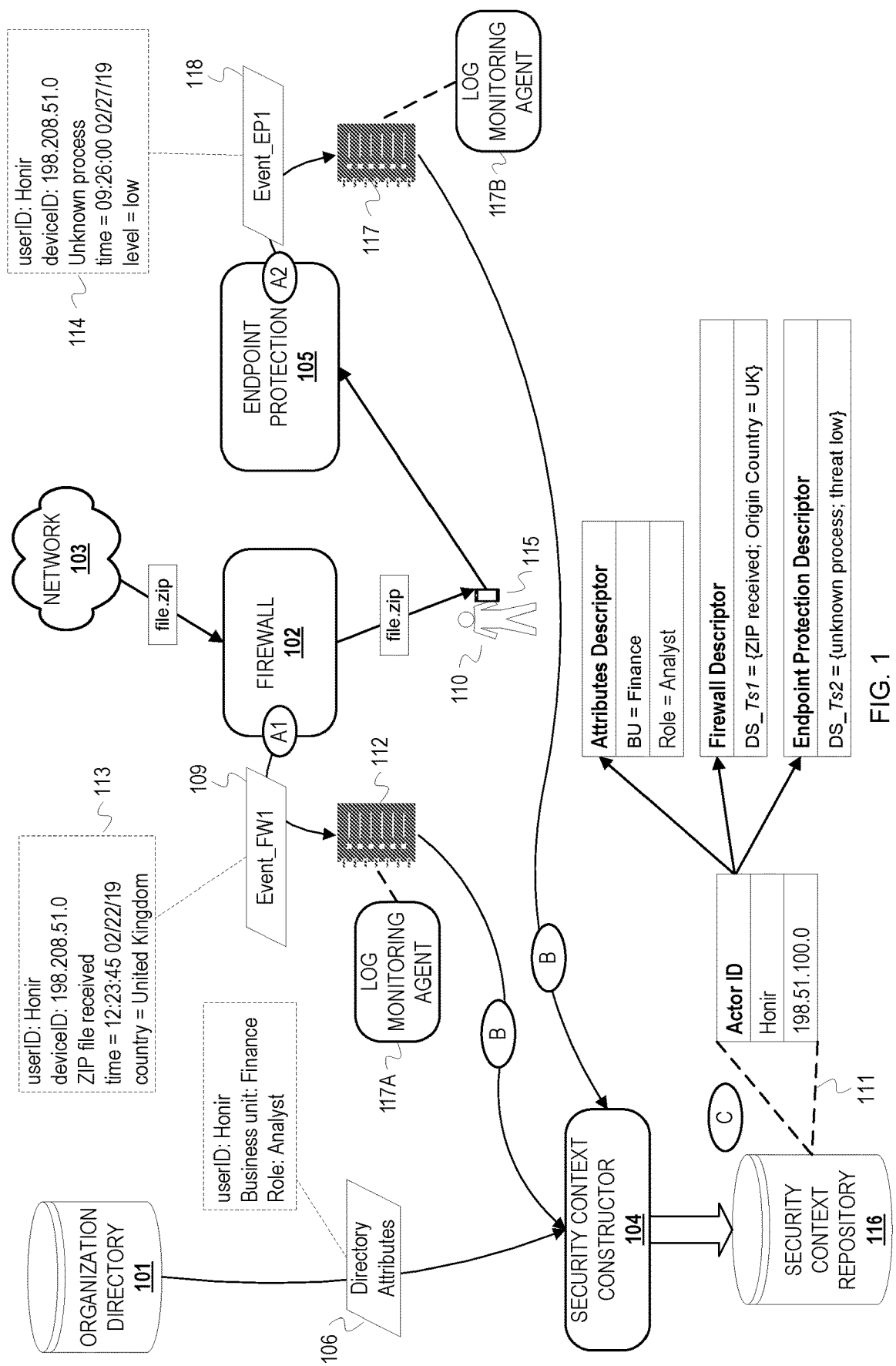
FIG. 1 depicts an example conceptual diagram of event-based security context construction for an actor within an enterprise or organization.

FIG. 1 depicts an example conceptual diagram of event-based security context construction for an actor within an enterprise or organization. An actor can be a user (more specifically a user representation), virtual machine, process, and/or endpoint device within the context of the organization. In this example, a user 110 logged into a device 115 is an actor within a network of an enterprise or organization. The enterprise or organization uses security components to secure its network. This example illustration only depicts a firewall 102 and an endpoint protection component 105, although an organization can employ many other security components. Security components and non-security components can originate information used for construction of security contexts. A security context constructor 104 constructs a security context with descriptors derived or extracted from this information. As previously mentioned, a security context is perspective based (i.e., can vary depending upon the consumer) and can change over time. Thus, constructing a security context may be ongoing and can involve attaching and removing descriptors in association with a corresponding actor.

FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A1, the firewall 102 detects an event and records the event into a log 112. The firewall 102 monitors and controls network traffic incoming from an external network 103 (e.g., public network). The firewall 102 can be configured to treat receipt of specific types of files (e.g., archive files) from an external source as an event to be logged. While monitoring incoming traffic from the external network 103, the firewall 102 detects that a ZIP file has been sent to the user 110. The firewall 102 can identify the user 110 as the recipient of the ZIP file based on examining a header of an incoming packet and/or session information conveying the file. The firewall 102 generates an event notification 109 with event information 113 and identifies the event as Event_FW1. Event notifications may include event metadata, such as the identity of an actor corresponding to the event, metadata indicating details of the event, etc. In this example, the event information 113 indicates the identifying information of the actor (i.e., a user identifier (ID) and device ID), description of the event, and time of the event. Actors corresponding to events (e.g., the event Event_FW1) can be identified based on session information available to the security entity or security platform component which detected the event, such as the firewall 102, by resolving a device address to a user ID, etc. The actor ID information is included in the event notification 109. The event information 113 in the event notification 109 also includes additional event metadata. In this example, the event description is "ZIP file received," and the additional event metadata indicates that the United Kingdom (UK) is the country of origin of the ZIP file. The firewall 102 records the event notification 109 into the log 112.

At stage A2, the endpoint protection component 105 detects an event and records the event into a log 117. The endpoint protection component 105 detects and prevents security threats targeting the device 115. The endpoint protection component 105 detects an unknown process executing on the device 115. The endpoint protection component 105 has been configured to treat detection of unknown processes as an event to be logged. The endpoint protection component 105 generates an event notification 118 with event information 114 and identifies the event as Event_EP1. As with the event information 113, the event information 114 includes the identifying information of the actor, a description of the event, time of the event, and additional event metadata. In this example, the event description is "unknown process," and the additional event metadata indicates the threat level of the unknown process. The endpoint protection component 105 records the event notification 118 into the log 117.

At stage B, the security context constructor 104 receives the event notifications 109 and 118 from the firewall 102 and the endpoint protection component 105, respectively, and generates descriptors. In this example, a log monitoring agent 117A corresponding to the log 112 communicates the event information 113 to the security context constructor 104. A log monitoring agent 117B corresponding to the log 117 communicates the event information 114 to the security context constructor 104. Communication of event information to the security context constructor 104 can be implemented differently. The log monitoring agents 117A-B can communicate detected event information to the security context constructor 104 periodically, as the agents 117A-B detect that new event notifications have been recorded into the logs 112 and 117, etc. Upon receipt of the event information 113, the security context constructor 104 determines an actor which corresponds to the event indicated in the event information 113. The security context constructor 104 also determines the actor which corresponds to the event indicated in the event information 114. The security context constructor 104 can determine the actor from the identifying information of the actor which was included in the event information 113 and event information 114 (i.e., user ID and device ID). In this example, the security context constructor 104 determines that an actor with user ID "Honir" and device ID (i.e., Internet Protocol (IP) address) 198.208.51.0 is the actor corresponding to the events for both of the event notifications 109 and 118.

The security context constructor 104 extracts metadata from the event information 113 and 114 from which descriptors will be generated. To determine the metadata which should be extracted for generation of descriptors (e.g., copied into a definition of a descriptor or used as a parameter when instantiating a descriptor), the security context constructor 104 examines the event information 113 and 114 for metadata which is "of interest" or could potentially be "of interest." For instance, event descriptions may be extracted. Additional event metadata which relates to the event description may also be extracted. In this example, the security context constructor 104 determines that the event description "ZIP file received" and metadata indicating the ZIP file country of origin should be extracted from the event information 113. The security context constructor 104 determines that the event description "unknown process" and metadata indicating the threat level of the unknown process should be extracted from the event information 114.

The security context constructor 104 generates descriptors from the extracted metadata. Descriptors may be generated from one field extracted from event information or multiple fields extracted from event information. In FIG. 1, the security context constructor 104 generates descriptors from multiple fields of both the event information 113 and the event information 114. The security context constructor 104 generates a descriptor named DS_Ts1 which is composed of the metadata extracted from the event information 113 (i.e., multiple fields from the event information 113). The descriptor DS_Ts1 indicates receipt of a ZIP file originating in the UK. The security context constructor 104 also generates a descriptor named DS_Ts2 which is composed of the metadata extracted from the event information 114. The descriptor DS_Ts2 indicates execution or attempted execution of an unknown process of a low threat level on a device.

To construct or modify a security context, the security context constructor 104 creates or updates a security context entry in a security context repository (hereinafter "repository") 116 by associating or attaching a descriptor(s) to an actor. The security context constructor 104 uses actor identifying information from an organization directory, for example, to create a security context entry. The security context constructor 104 can retrieve directory attributes 106 for the identified actor from the organization directory 101, assuming an entry has not yet been created for the actor in the repository 116. For instance, the security context constructor 104 may submit a query to the organization directory 101 which indicates actor ID information (e.g., the user ID). The security context constructor 104 may extract metadata included in the directory attributes 106 retrieved for the actor with user ID Honir for generation of descriptors. The security context constructor 104 extracts the business unit and role metadata from the directory attributes 106 and generates a descriptor for each piece of information.

At stage C, the security context constructor 104 attaches the descriptors to the actor ID for the user 110, or user ID "Honir," logged into the device 115 with device ID 198.208.51.0. Descriptors may be attached to an actor ID by adding descriptors to an entry in the repository 116 which exists or is created for the actor ID. The repository 116 maintains security context entries which associate actor IDs with the descriptors which have been attached to the actor IDs. The repository 116 may be indexed by user ID and/or device ID. In this example, the security context constructor 104 creates a security context entry 111 for the actor identified in the event information 113 and 114. The security context constructor 104 then stores the security context entry 111 in the repository 116.

The security context constructor 104 may create the security context entry 111 and add the descriptors to the security context entry 111 via an application programming interface (API). An API for creating security context entries can take descriptors as parameters, or descriptors can be added subsequent to initial creation of security context entries. For example, the security context constructor 104 may create the security context entry 111 for the actor ID via an API for a database insert command, an API for a Hypertext Transfer Protocol (HTTP) POST request communicated to a server which maintains the repository 116 (not depicted in FIG. 1), etc. The security context constructor 104 may add the descriptors to the security context entry 111 or other existing security context entries via an API for an HTTP PUT request communicated to a server which maintains the repository 116, an API for a database update command, etc. Once descriptors from attributes and behaviors have been attached to the actor via addition to the security context entry 111, security entities and security components can consume the descriptors stored in the security context entry 111 based on the actor's security context for subsequent enforcement of security policies.

Once the security context constructor 104 has created the security context entry 111 and inserted it into the repository 116, the security context entry 111 may be leveraged for providing "visibility" into an actor's activity and behavior. By providing a centralized repository such as the repository 116 for security contexts and descriptors on a per-actor basis, the descriptors forming the actor's security context entry 111 are visible to any component or entity with access to the repository 116 regardless of the component or entity from which descriptors in the security context entry 111 originated. Availability of this increased spread of security-related information gathered for an actor facilitates comprehensive analysis of events based on an actor's behavior in the context of security. The security context entry 111 may be leveraged for visibility alternatively or in addition to security policy enforcement. For instance, a security component or entity may retrieve information about behavior and activity of the actor indicated by the actor ID "Honir" included in the security context entry 111 stored in the repository 116 outside of policy enforcement. The security context entry 111 provides increased visibility due to the inclusion of descriptors which originated across different security components and entities in a network rather than being limited to one originating component or entity. Similarly, information from the organization directory 101 and from the security components (i.e., the firewall 102 and endpoint protection component 105) associated with an actor can be accessed with a single query to the repository 116. This visibility provides a comprehensive context for an actor's behavior in a network.

For example, if the credentials of the actor with actor ID "Honir" are compromised, the descriptors which were attached to the actor at the time of the credential theft event can be determined from the security context entry 111. The result of this analysis may contribute to defining new security policies based on combinations of descriptors determined to be related to the credential theft event. As another example, if multiple actors in the Finance business unit are associated with a descriptor indicating receipt of an externally-originated ZIP file at the time of a series of credential theft events affecting the actors, a new security policy for the firewall 102 may be created which quarantines ZIP files from an external sender which indicate members of the Finance business unit as a recipient. Security context entries in the repository 116 may also be leveraged to obtain information about actor behavior without necessarily enforcing security policies based on the security context entries.

Figure 2:
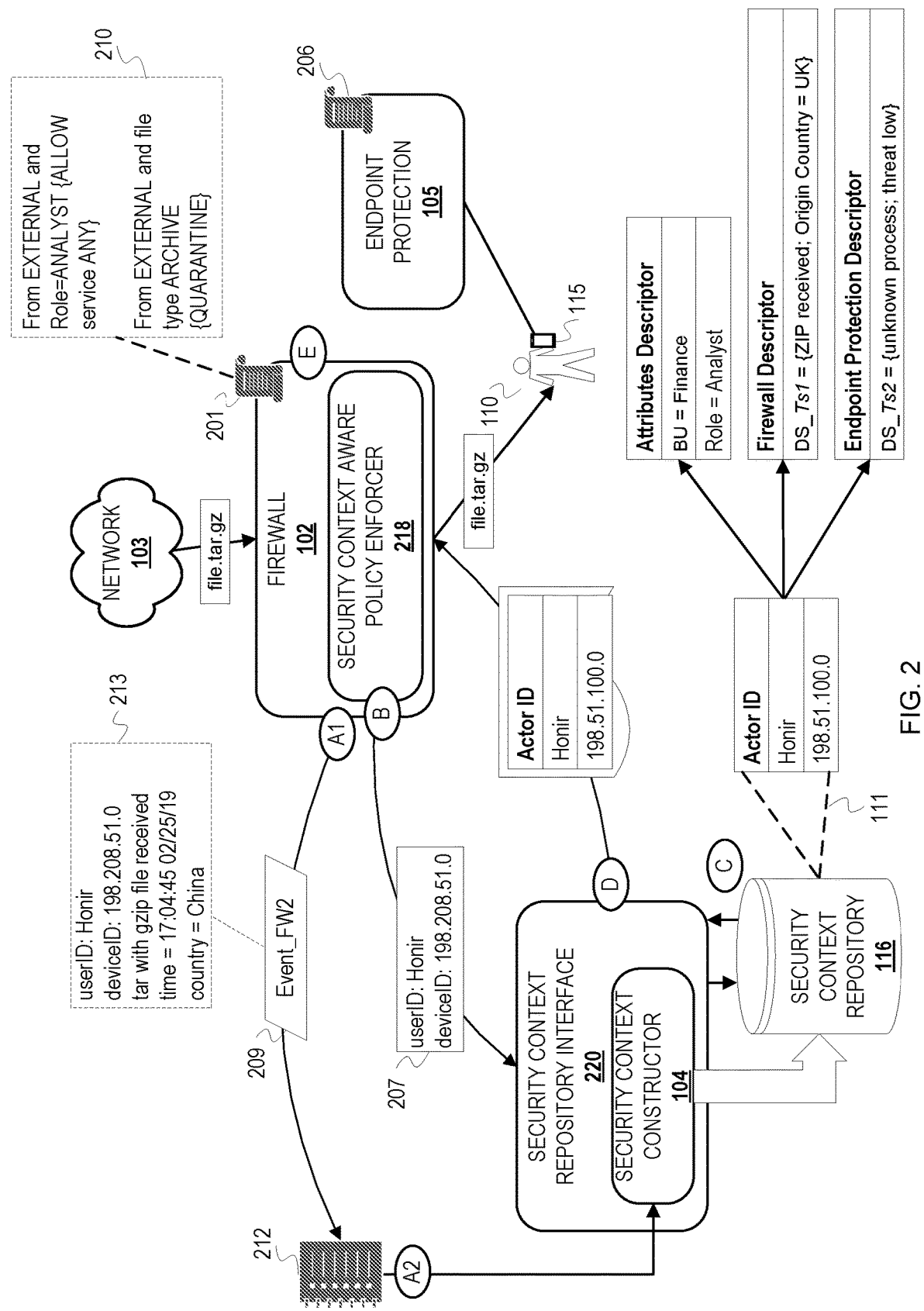
FIG. 2 depicts an example conceptual diagram of security context-based security policy enforcement.

FIG. 2 depicts an example conceptual diagram of security context-based security policy enforcement. To facilitate consumption of an actor's security context for security related operations, security policies are defined with conditions or criteria against which at least some of the descriptors attached to an actor can be evaluated to determine whether or not a security related action is to be taken upon the corresponding actor. Different security policies can be created to evaluate different descriptors "of interest" to the security entities enforcing the security policies. Thus, different combinations of descriptors in an actor's security context entry can be consumed depending upon the security policy and the security entity. In this example, firewall security policies 201 are attached (i.e., installed or otherwise accessible to) the firewall 102. Similarly, endpoint protection security policies 206 are attached to the endpoint protection component 105. The firewall security policies 201 and endpoint protection security policies 206 indicate actions to be taken on an actor upon detection of an event which triggers policy evaluation. This example illustration only depicts a firewall 102 as enforcing a security policy, although many other security components can enforce security policies. Security policies and the descriptors associated with enforced security policies may vary among security entities and security components based on aspects of an actor's security context which are pertinent to each security component. Additionally, though a descriptor may not be considered to be "of interest" to an entity at one time, it may become pertinent as security interests and concerns change.

FIG. 2 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A1, the firewall 102 detects a policy evaluation triggering event. In this example, the firewall 102 detects that another archive file from an external sender has been sent to the user 110. The firewall 102 has been configured to treat receipt of specific types of files, such as archive files, from an external source as an event which triggers a policy evaluation. The firewall 102 generates an event notification 209 with event information 213 and identifies the event as Event_FW2. The event information 213 of the event notification 209 indicates actor ID information, time of the event, event description, and additional event metadata. In this example, the event description is "tar with gzip file received," and the additional event metadata indicates that the file originated in China. The firewall 102 records the event notification 209 into the event log 212. Though not described further in reference to FIG. 2, the event information 213 may be communicated to the security context constructor 104 at stage A2 for subsequent generation of descriptors from metadata extracted from the event information 213 and attachment of the descriptors to the actor (i.e., the user 110 and device 115) as described in reference to FIG. 1. The descriptors extracted from the event information 213 may be used immediately for enforcement of a security policy based on the policy evaluation triggering event. For instance, the firewall security policies 201 can be enforced based on generation and attachment to the actor of a descriptor indicating the receipt of an archive file from China as denoted in the event information 213. Alternatively, this descriptor may be added to the security context entry 111 stored in the repository 116 for visibility purposes as described in reference to FIG. 1 rather than enforcement of the firewall security policies based on the external archive file receipt. The precedence of descriptor attachment and policy enforcement for a particular security entity or component (e.g., the firewall 102) may be defined in additional policies attached to the firewall 102 or defined in the firewall security policies 201.

At stage B, a security context aware policy enforcer (hereinafter "policy enforcer") 218 communicates actor ID information 207 to a security context repository interface (hereinafter "repository interface") 220 for retrieval of a security context entry which exists for the actor. The actor ID information 207 indicates identifying information of the actor (e.g., user ID and/or device ID, etc.) which was determined after detecting the policy evaluation triggering event at stage A1. The actor ID information 207 can be communicated as a request for a security context entry for the actor indicated in the actor ID information 207. For example, the actor ID information 207 can be communicated to the repository interface 220 as an HTTP GET request.

The policy enforcer 218 enforces the firewall security policies 201 based on an actor's security context. For instance, based on determining that an actor's behavior triggered a policy evaluation, the policy enforcer 218 can retrieve the actor's security context entry 111 from the repository 116 to determine if one or more of the firewall security policies 201 are to be enforced for the actor. Thus, the firewall security policies 201 are enforced based on the triggering event within the actor's security context. As an example, security policy information 210 corresponding to the firewall security policies 201 includes two policies which each indicate different conditions against which an actor's security context is evaluated. Accordingly, after retrieving the actor's security context entry 111, the contents of the entry 111 are evaluated against the descriptors which are relevant to the security policy information 210 to determine if at least one policy should be enforced for the actor and, if so, how the policy is to be enforced. In another implementation, the policy enforcer 218 may be a "wrapper" for legacy code which executes on a security component, such as the firewall 102. The policy enforcer 218 then determines if the firewall 102 is "context aware" (i.e., enforces security policies based on an actor's security context). For example, the policy enforcer 218 can determine if security-context based policies have been attached to the firewall 102 in addition to "conventional" policies. Upon determining that the firewall 102 is context aware, the policy enforcer 218 can then communicate the actor ID information 207 to the repository interface 220. If the firewall 102 is not context aware, the conventional security policies may be enforced instead.

At stage C, the repository interface 220 retrieves a security context entry from the repository for the actor indicated in the actor ID information 207. The security context entry 111 has previously been created for the actor indicated by the actor ID information (i.e., the user ID Honir using the device with IP address 198.51.100.0). To obtain the security context entry 111, the repository interface 220 may generate and submit a request to the repository 116, leverage an API for accessing the repository 116 or a server which maintains the repository, etc. For example, the repository interface 220 may submit a request to retrieve the security context entry 111 to a server which maintains the repository 116 with an API for an HTTP GET request.

At stage D, the repository interface 220 sends the metadata (i.e., actor ID information and descriptors) included in the security context entry 111 to the policy enforcer 218. The repository interface 220 may extract the metadata from the security context entry 111 and communicate the extracted metadata to the policy enforcer 218. For instance, the repository interface 220 can send a message to the policy enforcer 218 which includes the descriptors in the security context entry 111 as the payload. The repository interface 220 may alternatively create and send a copy of the security context entry 111 to the policy enforcer 218.

At stage E, the policy enforcer 218 determines the descriptors which are pertinent to the firewall security policies 201 and evaluates the descriptors attached to the actor against the firewall security policies 201. The security policy information 210 corresponding to the firewall security policies 201 indicates that the firewall 102 enforces two policies based on an actor's security context. A first policy dictates that any service should be allowed upon detecting that an actor with the role of an analyst has received a communication originating external to the enterprise or organization. Descriptors which are pertinent to this policy include the actor's role and descriptors indicating an origin of recent communications (e.g., location, entity, etc.). A second policy dictates that if an actor receives an archive file type from an external source, the archive file is to be quarantined. Descriptors which are pertinent to this policy include descriptors for recent receipt or download of archive files and origination of the files. Relevant descriptors for some conditions may be enumerated in the firewall security policies 201. Alternatively or in addition, the policy enforcer 218 may directly evaluate descriptors against logical conditions indicated in the security policy information 210.

The policy enforcer 218 determines which descriptors are attached to the actor based on the communication received from the repository interface 220 (e.g., by extracting the descriptors). The policy enforcer 218 then compares the descriptors attached to the security policy information 210 to determine if the descriptors satisfy either of the security policies indicated in the security policy information 210. In this example, the policy enforcer 218 determines that the descriptors for business unit and role have been attached to the actor as well as the firewall descriptor DS_Ts1, which indicates that the actor received a ZIP file originating in the UK, and the endpoint protection descriptor DS_Ts2, which indicates that an unknown process of low threat level had been detected on the actor's device.

The policy enforcer 218 evaluates these descriptors against the security policy information 210 to determine if they satisfy the conditions for policy enforcement. The first policy indicates that communications sent over an external network (e.g., the external network 103) to an actor with the role of analyst should be allowed. The policy enforcer 218 determines that descriptors have been attached to the actor which designate that the actor's role is analyst and the actor has previously received a communication from an external source. Specifically, the policy enforcer 218 identifies the Role and Ds_Ts1 descriptors. The policy enforcer 218 determines that these descriptors are relevant to the "allow any service" policy. The second policy indicates that the firewall 102 is to quarantine incoming communications (e.g., emails with ZIP files attached) if archive files sent by an external source have been detected. The policy enforcer 218 also determines that descriptors have been attached to the actor which designate that the actor has previously received an archive file originating from an external source. Specifically, the policy enforcer 218 identifies the DS_Ts1 descriptor.

The policy enforcer 218 then enforces the firewall security policies 201 based on determining if relevant descriptors are attached to the actor. In this example, the descriptors attached to the actor satisfy the conditions included in the security policy information 210 for both policies. Though the "allow service" policy also applies to the actor based on the Role and Ds_Ts1 descriptors, the quarantine policy applies to the actor based on the Ds_Ts1 descriptor and corresponds to the policy evaluation-triggering event. As a result, the firewall quarantines the archive file originating in China which was sent over the external network 103 (file-.tar.gzip in FIG. 2). Security context-based policy enforcement provides for flexible enforcement of security policies based on different aspects of an actor's security context. For instance, while an actor's role of Analyst may satisfy a security policy that allows analysts access to any service, another policy or a condition within that same policy may restrict that access to any service if the security context for the actor indicates multiple threat events within a certain time window. As an example, an actor with a role of analyst would be restricted from ANY service if the security context aware policy enforcer 218 is enforcing a policy that restricts access to external services for any actor with 2 medium threat events in the last day or at least 3 low level threat events in the last week.

Figure 3:
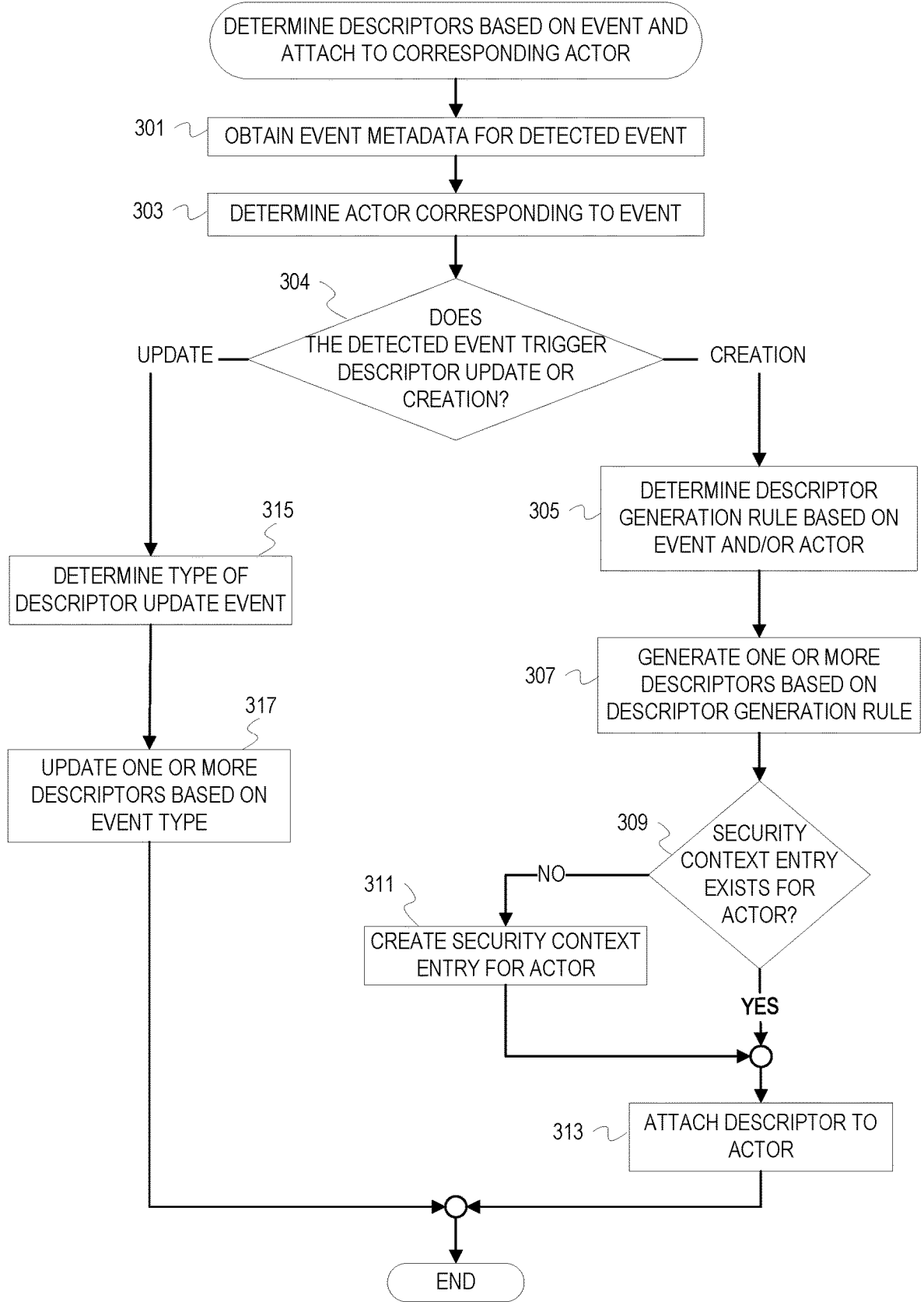
FIG. 3 is a flowchart of example operations for determining descriptors based on detecting an event and attaching the descriptors to an actor.

FIG. 3 is a flowchart of example operations for determining descriptors based on detecting an event and attaching the descriptors to an actor. The example operations refer to a security context constructor (hereinafter the "constructor") as performing the depicted operations for consistency with FIG. 1, although naming of software and program code can vary among implementations.

At block 301, the constructor obtains metadata corresponding to a detected event. Metadata can be received based on detection of events by any security component or other entity which an enterprise or organization utilizes to enforce security policies. The metadata may indicate identifying information of the actor, such as user ID, device ID (e.g., an IP address), both user ID and device ID, etc. The metadata may also include event details, such as an event description and event timestamp. Metadata may conform to a particular schema or format, such as JavaScript Object Notation (JSON) format. The constructor may obtain the metadata by monitoring an event log for new events and retrieving metadata after determining that a new event has been stored in the event log. Alternatively, the constructor may obtain metadata from a log monitoring agent deployed to an event log which communicates event metadata to the constructor, based on subscribing to the agent for example.

At block 303, the constructor determines an actor which corresponds to the event. The actor is determined based on actor ID information included in the event metadata. The actor ID information can be based on session information which is available to the security component which detected the event, resolution of a device address to a user ID, authentication events, etc. The actor may be a user, a device, or a user logged into a certain device. For instance, the constructor may determine a user ID, device ID, or both a user ID and device ID which were included in the metadata.

At block 304, the constructor determines if the detected event prompts an update of descriptors or creation of descriptors. Descriptors can be created and added to an actor's security context entry if a creation-triggering event has been detected. Descriptors which have already been attached to an actor can be updated if an update-triggering event has been detected. The constructor may determine whether the event is an update-triggering event or a creation-triggering event based on an event description included in the metadata or may be otherwise configured to determine an event category (e.g., based on event categorization policies attached to the constructor). If the detected event is a descriptor creation-triggering event, control continues to block 305. If the detected event is a descriptor update-triggering event, control continues to block 315.

At block 305, the constructor determines a descriptor generation rule based on the event and/or the actor. The constructor may extract different metadata fields based on the type of event which has been detected (e.g., archive file download, credential theft, etc.) and/or the type of actor. Descriptor generation rules can dictate which metadata fields the constructor is to extract for descriptor generation. Descriptor generation rules may also indicate a format or structure of the descriptor. For instance, descriptors can use a single metadata field or multiple metadata fields extracted from the event metadata. As an example, a descriptor generation rule can indicate that each field of the event metadata except for the actor ID and event time should be extracted.

At block 307, the constructor generates one or more descriptors based on the descriptor generation rule. The constructor extracts event metadata fields according to the descriptor generation rule to create a descriptor. To extract metadata, metadata fields may be copied into a new structure for the descriptor. The constructor may perform other techniques for analysis and extraction of metadata to generate a descriptor.

At block 309, the constructor determines if a security context entry exists for the actor. Security context entries created for actors can be stored in a repository, such as the repository 116 depicted in FIG. 1. The constructor can generate and submit a query to the repository to determine if an entry has previously been created for the actor. For example, the constructor may send a read request to the repository which indicates the actor ID and analyze the response to determine if the entry exists. If a security context entry exists for the actor, control continues to block 311. If a security context entry does not exist for the actor, control continues to block 313.

At block 311, the constructor creates a security context entry for the actor. The security context entry can be an entry in the repository, a data structure, or any structure which accommodates an indication or identifier of an actor and the descriptors associated with the actor. The constructor may create a security context entry by generating and communicating a create request to the repository which indicates identifying information of the actor, such as an HTTP POST request communicated to a server which maintains the repository, via an API for a create request, etc.

At block 313, the constructor attaches the descriptor to the actor. Descriptors may be attached by generating and submitting an update request to the repository which indicates the actor ID and the descriptors, such as an HTTP PUT request communicated to a server which maintains the repository, via an API for an update request, etc. If the constructor created a security context entry at block 311, the constructor may attach the descriptors by including the descriptors as parameters in the create request or through separate update operations.

If it was previously determined that the detected event trigger corresponds to a descriptor update action instead of creation, then the constructor determines a type of the descriptor update event at block 315. Descriptor update events are those which prompt an update to descriptors that have already been attached to the actor. For example, descriptor update events may prompt an update to a cumulative descriptor, such as descriptors which indicate an authentication failure count, a count of a certain type of file received in a designated time window, etc. Some types of descriptor update events, such as "remediating" events, may prompt removal or deletion of a descriptor from an actor's security context entry. Alternatively, remediating events may prompt creation of a descriptor indicating an event remediation which is added to the actor's security context. Remediating events resolve the underlying security concern for a descriptor. As an example, a password reset event remediates a compromised credentials event. The password reset event may prompt removal of a descriptor attached after the compromised credentials event was detected. The password reset event may instead prompt generation of a new descriptor indicating that the compromised credentials event has been resolved through a password reset. The descriptor generated from the remediating event may be grouped or correlated with the descriptors generated from the security event in the security context entry (e.g., by creating a comprehensive descriptor indicating security event and its resolution, correlating the descriptors, etc.). The security component which generated the event notification may communicate the type of update event to the constructor as part of event metadata. For instance, event categorization policies may be attached to the security component or the constructor. As multiple events for an actor are detected, the constructor aggregates event information per actor and then may cull this aggregate of information to maintain relevant information (e.g., information can become stale over time) and/or avoid a security context from becoming bloated and consuming too much memory and/or becoming inefficient to access.

At block 317, the constructor updates one or more descriptors based on the event type. The constructor can submit a request to the repository to update, delete, or otherwise modify a descriptor for an indicated actor. For example, if the constructor determined that a descriptor is to be removed as a result of the descriptor update event, the constructor can indicate in the request the descriptor which should be removed from the actor's security context entry (e.g., via an API for descriptor removal). The construction can be programmed to remove a descriptor based on various conditions. Examples of removal conditions include expiration of an information lifetime or validity period, exceeding a limit on descriptors overall per security context, exceeding a limit on descriptors by type (e.g., intrusion detection related, credential related, endpoint related, etc.), exceeding a limit by source, etc. Cumulative descriptors may be updated by adding a new field to a descriptor, updating an existing field of a descriptor (e.g., incrementing or decrementing a count field), etc.

Although FIG. 3 describes an example operation (304) that determines whether a detected event triggers a descriptor update or creation, embodiments are not so limited. Embodiments can call an update type of function or method with the event information and actor ID information as arguments that does not distinguish between creation and update on the caller/invoker end. The recipient interface (callee or invokee) will update a security context entry if one is found based on the actor ID information and create the security context entry if no corresponding entry is found based on the actor ID information.

Figure 4:
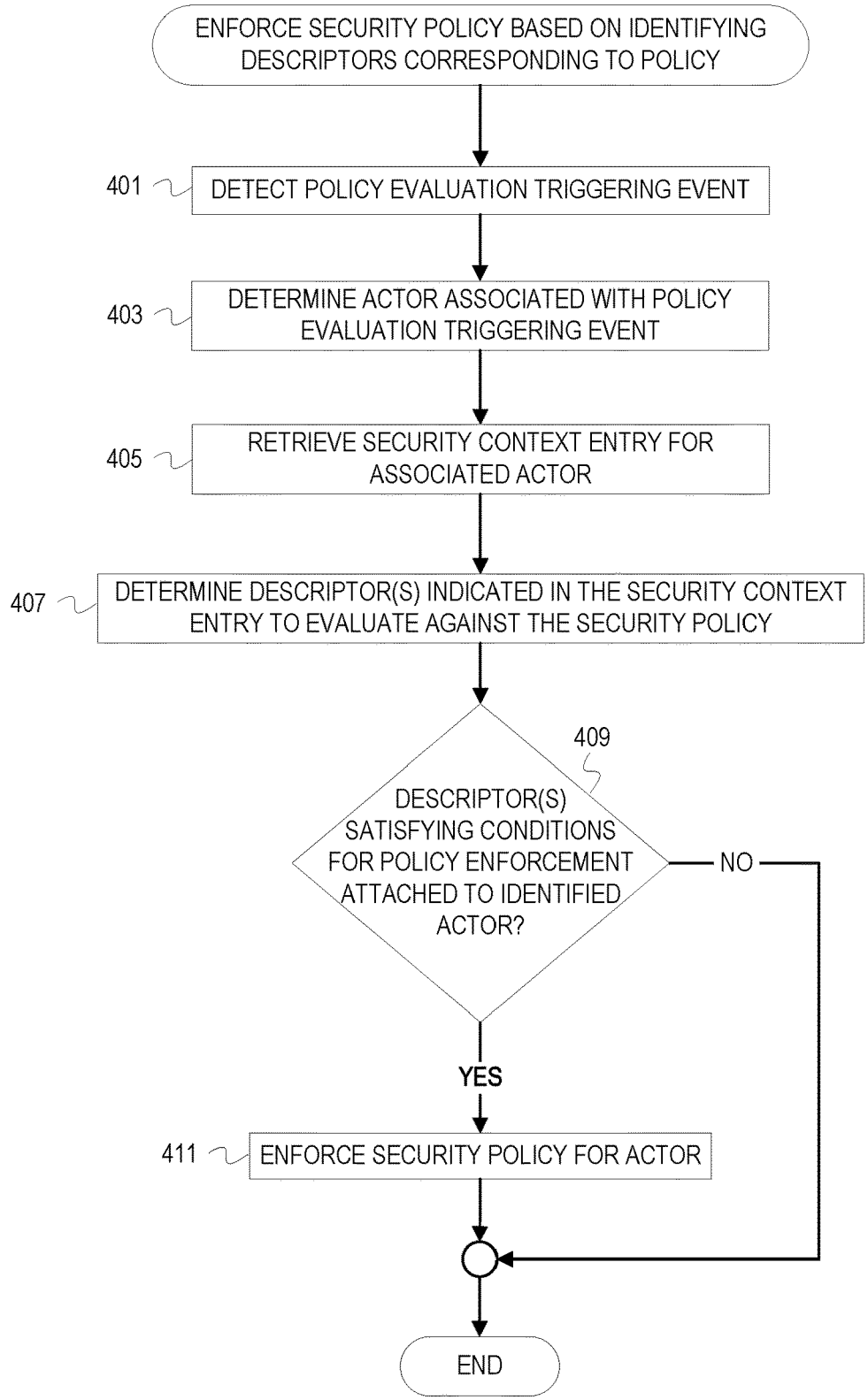
FIG. 4 is a flowchart of example operations for enforcing a security policy based on identifying descriptors attached to an actor which correspond to the security policy.

FIG. 4 is a flowchart of example operations for enforcing a security policy based on identifying descriptors attached to an actor which correspond to the security policy. The example operations refer to a security context aware policy enforcer (hereinafter the "policy enforcer") as performing the depicted operations for consistency with FIG. 2, although naming of software and program code can vary among implementations.

At block 401, the policy enforcer detects a security policy evaluation triggering event. The policy enforcer can be configured to treat certain events detected due to behavior of an actor as triggering evaluation of a security policy attached to the corresponding security component. For example, a policy enforcer which enforces endpoint protection security policies may treat attempted file downloads as a policy evaluation triggering event.

At block 403, the policy enforcer determines an actor associated with the policy evaluation triggering event. The policy enforcer may determine the actor from session information which is available to the corresponding security component, by resolving a device address to a user ID, based on authentication events, etc.

At block 405, the policy enforcer retrieves a security context entry for the actor associated with the event. The security context entry for the actor can be stored in a repository as described with reference to FIGS. 2 and 3. To retrieve the actor's security context entry, the policy enforcer can request the security context entry for the actor from the repository. For example, the policy enforcer may generate and send a request for the security context entry indicating the actor ID via an HTTP GET request to a server which maintains the repository, via an API, such as an API for an HTTP GET request, etc. The retrieved security context entry indicates the actor ID and descriptors which have been attached to the actor. For example, the security context entry which is retrieved may be a copy of the security context entry stored in the repository or another listing of extracted actor ID and descriptor information.

At block 407, the policy enforcer determines which descriptors indicated in the retrieved security context entry are to be evaluated against the security policy that has been triggered for enforcement. Conditions for enforcing the security policy indicate descriptors which, when attached to an actor whose behavior triggered the policy evaluation, prompt security policy enforcement. The policy enforcer can determine which descriptors to evaluate based on the conditions indicated in the security policy and/or based on criteria specified for the security policy. Descriptor metadata can indicate an attribute of the descriptor recognizable by the policy enforcer. The attribute may correspond to the source of the descriptor, event type described by the descriptor, time period, etc. The security policy can specify criterion of descriptors to be evaluated (e.g., network event related descriptors or endpoint event related descriptors). A security policy may specify particular descriptor sources or descriptor types relevant to the security policy. The determine of relevant descriptors may be determined as the conditions or clauses of the security policy are traversed. Different conditions or clauses of a security policy may involve different descriptors. As an illustrative example of descriptor selection for evaluation, if a security policy indicates that an action is to be taken if the actor has received an archive file from an external source, the policy enforcer determines that descriptors indicating receipt of any type of archive file from any external source satisfy the condition for policy enforcement. The policy enforcer may enumerate the descriptor fields which satisfy conditions for or are exempt from enforcement of security policies for comparison against descriptors attached to the actor.

At block 409, the policy enforcer determines if one or more descriptors which satisfy the conditions for security policy enforcement are attached to the identified actor. If the conditions indicate one or more individual descriptors (i.e., rather than a range, category of descriptors, or other condition which can be satisfied by multiple descriptors), the policy enforcer examines the actor's security context entry to determine if the individual descriptors are present. Otherwise, the policy enforcer determines if descriptors which satisfy the conditions for policy enforcement are in the security context entry. An example of a condition which can be satisfied by multiple descriptors is "archive file received from external sender." Referring to the examples depicted in FIGS. 1 and 2, both a descriptor for receipt of a ZIP file originating in the UK and a descriptor for receipt of a tar with gzip file originating in China satisfy this condition. To determine if a descriptor which satisfies the condition is attached to the actor, the policy enforcer may compare one or more fields of the descriptor with a list of descriptors or descriptor fields enumerated by the policy enforcer, evaluate the descriptor fields directly against the conditions, etc. If one or more descriptors satisfying the conditions for security policy enforcement are attached to the actor, control continues to block 411. If descriptors satisfying the conditions for security policy enforcement are not attached to the actor, control ends.

At block 411, the policy enforcer enforces the security policy for the actor. The policy enforcer performs the action indicated by the security policy against the actor. For instance, with reference to FIG. 2, the firewall can enforce a security policy by quarantining an email which contains a ZIP file destined for the actor. The policy enforcer may also or alternatively associate a classification (e.g., a tag, label, or other designation) with the actor after determining that a security policy applies to the actor. For example, an enterprise or organization may define actors who have received ZIP files from external sources as high risk. Upon determining that the descriptors attached to an actor satisfy these conditions, the policy enforcer can attach a "high-risk actor" tag to the actor.

Figure 5:
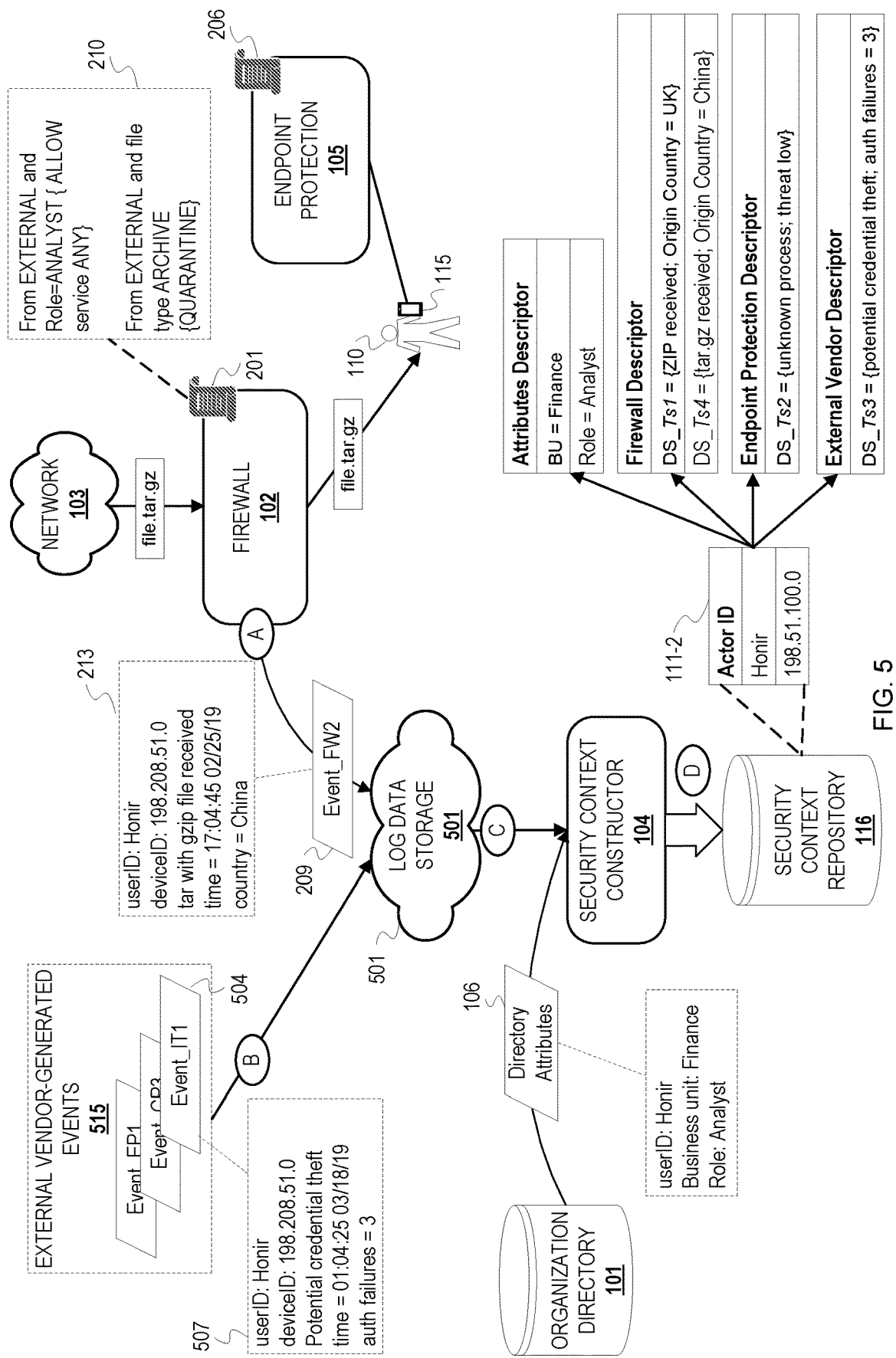
FIG. 5 is an example conceptual diagram of security context construction for an actor based on events detected by both security components and external vendors.

FIG. 5 is an example conceptual diagram of security context construction for an actor based on events detected by both security components and external vendors. This example assumes that a security context entry which includes descriptors generated from detected events already exists for an actor (i.e., the security context entry 111 in FIGS. 1 and 2). In addition to security components of an enterprise or organization's security framework or platform, events can be detected by other sources, such as third-party sources or Internet of things (IoT) devices. The sources which generate event metadata, such as the firewall 102 and external vendors, send event metadata for storage in log data storage 501 (e.g., a data lake or data warehouse). Log data storage 501 makes event metadata for events detected by security components belonging to an enterprise or organization security platform, security components belonging to another security framework, third-party sources, and/or other external vendors accessible to any component or entity configured to retrieve event metadata from log data storage 501. For instance, the log data storage 501 may be cloud storage. Storing event metadata generated by security components as well as external vendors facilitates creation of a comprehensive security context for an actor.

FIG. 5 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the firewall 102 detects an archive file receipt event and records the event. As similar to the example depicted in FIG. 2, while monitoring incoming traffic from the external network 103, the firewall 102 detects that a tar with gzip file has been sent to the user 110. The firewall 102 generates an event notification 209 with event information 213 and identifies the event as Event_FW2. The event information 213 within the event notification 209 includes event metadata. In this example, the event information 213 indicates the identifying information of the actor, a description of the event, and time of the event. The event information 213 also includes additional event metadata. In this example, the event description is "tar with gzip file received," and the additional event metadata indicates that the file originated in China. The firewall 102 records the event notification 209 in log data storage 501.

At stage B, event metadata from external vendor-generated events 515 is stored in log data storage 501. The external vendor-generated events 515 can be received from any source which is configured to detect events and generate and forward event metadata to log data storage 501. For example, an event notification 504 which originated from an external vendor identified as Event_IT1 is communicated to log data storage 501 to make event information 507 accessible to the security components of the enterprise or organization. The event information 507 indicates that a potential credential theft event has been detected for the actor identified as the user ID "Honir" logged into a device with IP address 198.208.51.0 (i.e., the user 110 and device 115). External vendors may generate potential credential theft events after detecting a certain number of failed authentication attempts. In this example, the event information 507 indicates that three authentication failures have been detected for the actor. The external vendor-generated events 515 can be organized in log data storage 501 based on an identifier of the originating source, event time, etc.

At stage C, the security context constructor 104 retrieves event metadata from log data storage 501 and generates descriptors. The security context constructor 104 may retrieve event metadata from log data storage 501 by monitoring log data storage 501 as new event notifications are received and retrieving event metadata as it is detected. The security context constructor 104 may alternatively retrieve event metadata through communication with agents which monitor log data storage 501 (not depicted in FIG. 5). Agents may communicate event metadata to the security context constructor 104 as event metadata is received in log data storage 501, based on the security context constructor 104 polling the agents for event metadata, etc. The descriptors are generated by extracting event metadata in a similar manner as described in FIG. 1 at stage B. Descriptors can be generated from event metadata originating from any source, including security components belonging to an enterprise or organization security system (e.g., the firewall 102), external vendors, and/or attributes from the organization directory 101. In this example, two new descriptors are generated from the event information 213 and event information 507. The security context constructor 104 generates a descriptor named DS_Ts4 which is composed of the metadata extracted from the event information 213. The descriptor DS_Ts4 indicates receipt of a tar with gzip file originating in China. The security context constructor 104 also generates a descriptor named DS_Ts3 which is composed of the metadata extracted from the event information 507. The descriptor DS_Ts3 indicates that the actor's credentials have potentially been compromised due to detecting a threshold number of authentication failures.

At stage D, the security context constructor 104 attaches the descriptors to the actor. The descriptors are attached to the actor in a similar manner as described in FIG. 1 at stage C. In this example, the security context constructor 104 determines that both the event information 213 and event information 507 used to generate the descriptors DS_Ts3 and DS_Ts4 indicate the actor ID corresponding to the user "Honir" logged into device with IP address 198.51.100.0.

The security context constructor 104 can attach the descriptors to the actor ID by adding descriptors to the actor's security context entry 111 in the repository 116. The security context constructor 104 updates the security context entry 111 for the actor with the newly generated descriptors DS_Ts3 and DS_Ts4. For instance, the security context constructor may leverage an API for a database update request, communicate an HTTP PUT request to a server which maintains the repository 116, etc. The actor's updated security context entry (hereinafter the "security context entry") 111-2 includes the descriptors created from attributes from the organization directory 101, descriptors created from events detected by security components, and descriptors created from events detected by external vendors. In effect, components which enforce security policies based on an actor's security context can "consume" aspects of the actor's security context which originated from different security components and entities due to leveraging the common storage of event metadata in log data storage 501.

The security context constructor 104 can also correlate descriptors which are attached to the actor ID. Descriptor correlation may occur during initial generation of descriptors as depicted at stage C or following stage D as new event metadata from different security components or entities is written to log data storage 501. Correlation of descriptors originating from different sources which have been added to the security context entry 111-2 reflects relationships between different descriptors and the events triggering generation of those descriptors in the security context entry 111-2. Any of the attributes descriptors, firewall descriptors, endpoint protection descriptors, and/or the external vendor descriptors of the security context entry 111-2 as well as other descriptors generated from event information in log data storage 501 may be correlated. As a result, descriptors having related triggering events can be linked rather than appearing as though generated from independent events. For example, while a firewall descriptor may indicate receipt of a ZIP file originating in the UK (e.g., DS_Ts1), an endpoint protection descriptor may indicate that a process executing on a device as a result of downloading the ZIP file is of a low threat level (e.g., DS_Ts2). A correlation between these descriptors indicates that the potential security event of the ZIP file receipt/download provided no imminent security threat. These correlations can also be indicated when viewing an actor's security context retrieved from the repository 116, such as via a graphical user interface (not depicted in FIG. 5), rather than presenting the descriptors within each descriptor category linearly (e.g., in a list).

To determine whether to correlate descriptors, the security context constructor 104 compares event information from log data storage 501 retrieved from different security components, entities, or vendors involved in a related sequence of events. The security context constructor 104 can be programmed to correlate events based on satisfying a matching threshold (e.g., a specified percentage or number of event attributes that match) and/or a relative time range (e.g., events within 5 milliseconds of each other) for an individual actor. For instance, after identifying the event information from the firewall 102 indicating receipt of an archive file, the security context constructor 104 may identify the event subsequently detected by the endpoint protection component 105 (e.g., based on timestamps recorded in log data storage 501). The security context constructor 104 determines that the unknown process launched by the archive file download which was detected by the endpoint protection component 105 was of low threat. As a result, the security context constructor 104 can correlate the descriptors generated from these two events, or the DS_Ts1 and DS_Ts2 descriptors, in the security context entry 111. Correlations may be indicated by an addition attribute, a tag, etc.

Figure 6:
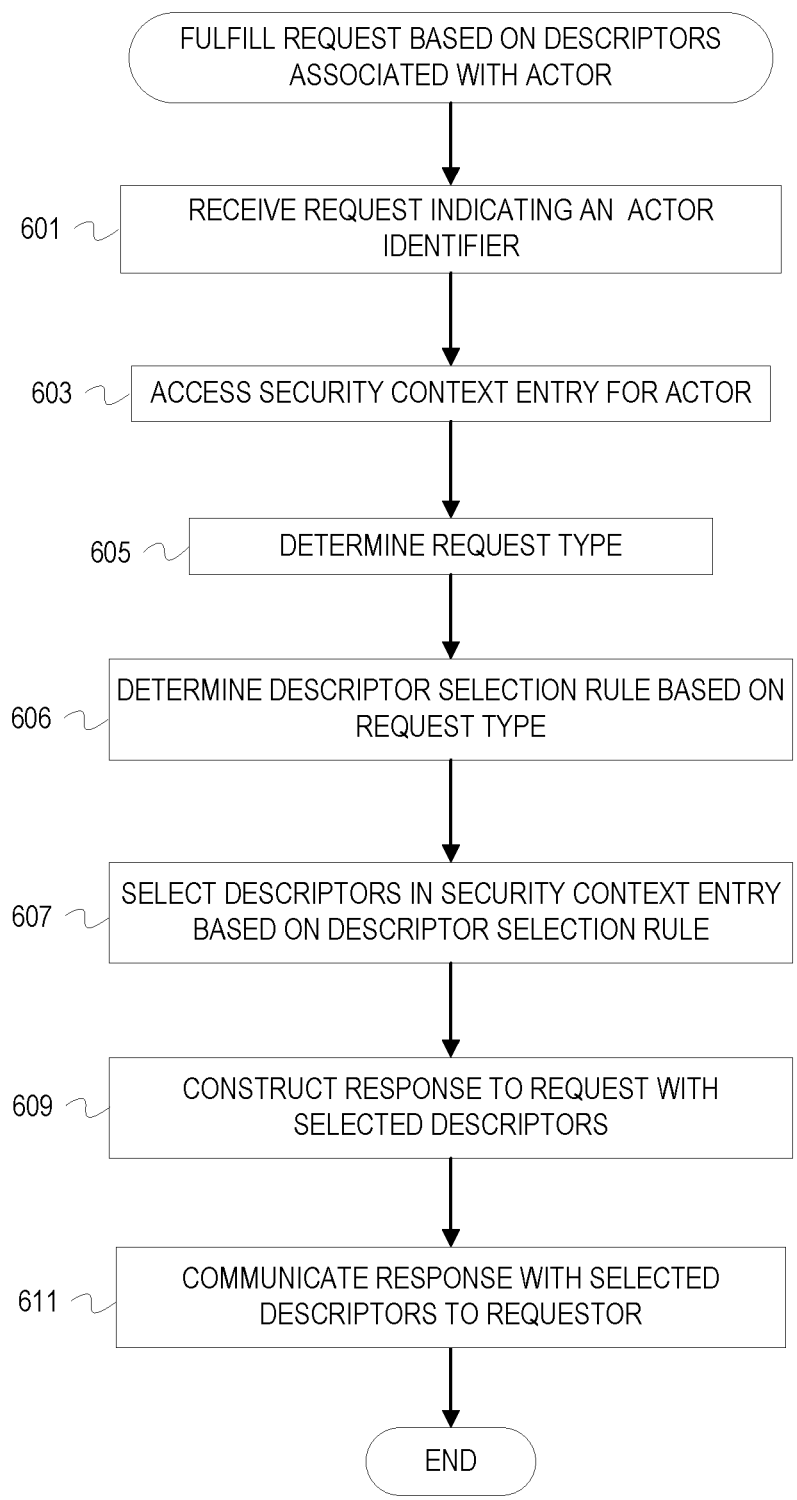
FIG. 6 is a flowchart of example operations for leveraging a security context entry in responding to different request types.

FIG. 6 is a flowchart of example operations for leveraging a security context entry in responding to different request types. The example operations refer to a security context constructor (hereinafter the "constructor") as performing the depicted operations, although naming of software and program code can vary among implementations.

At block 601, the constructor receives a request which indicates an actor ID. Requests may be received from security components or entities in a network. The actor ID indicated in the request may include one or more of a user ID, a device ID (e.g., an IP address), etc. For example, as depicted in FIG. 1, the actor ID can indicate a user ID and an IP address of a device associated with the user ID. The constructor may accommodate requests which indicate more than one actor ID in some implementations. For instance, if an event impacts multiple actors, a request indicating the actor IDs of each affected actor can be communicated to the constructor (e.g., to retrieve descriptors associated with each affected actor at the time of the event).

At block 603, the constructor accesses a security context entry for the actor. As described previously, a security context entry can be a data structure or any structure which accommodates an indication or identifier of an actor and the descriptors associated with the actor based on security-related events previously detected in association with the actor. Security context entries for actors associated with a network can be stored in a repository or a database, such as the security context repository 116 depicted in FIGS. 1, 2, and 5. The constructor may access the actor's security context entry by communicating a request indicating the actor ID to a repository which stores security context entries for actors within a network. For instance, the constructor may use an API for a security context entry request for communicating with the repository or a server which maintains the repository (e.g., an API for an HTTP GET request).

At block 605, the constructor determines the request type. Requests can correspond to security policy enforcement, reporting, and viewing the actor's security context entry. Security policy enforcement request are communicated to the constructor to determine if a security policy applies to the actor. Security policy enforcement requests may indicate the actor ID alone or in addition to criteria for enforcement and/or a list of descriptors which are pertinent to the security policy. A reporting request may indicate one or more descriptors to receive a "report" from the constructor as to whether the actor is associated with one or more of the descriptors indicated in the request. A view request is communicated to the constructor to view an actor's security context either at the time of issuance of the request or at a previous time denoted in the request. The constructor may determine the request type based on metadata communicated from the requestor (e.g., with a request identifier). The constructor may also determine the request type based on description of an event included in metadata communicated in the request or may be otherwise configured to determine a request category (e.g., based on request categorization policies attached to the constructor). For instance, a security policy enforcement request can indicate an event which the constructor is configured to recognize as a security policy evaluation-triggering event as similarly described in reference to FIGS. 2 and 4. A view request may indicate a timestamp in addition to the actor ID. A reporting request may indicate one or more descriptors or a logical combination thereof (e.g., Role=Analyst AND DS_Ts1 OR DS_Ts3) that can be independent of event detection.

At block 606, the constructor determines a descriptor selection rule based on the request type. Descriptor selection rules dictate criteria for which descriptors to select or how descriptors are to be selected to fulfill the request. Descriptor selection rules may be associated with a corresponding request type. For instance, based on determining that the request is a request to view the actor's security context entry as of 08:25:29 on Jun. 19, 2019, a descriptor selection rule for view requests can indicate that the constructor should select the descriptors having a timestamp on or before the time indicated in the request (i.e., 08:25:29 on Jun. 19, 2019). As another example, a descriptor selection rule for security policy enforcement requests may be based on whether the request indicated a particular subset of descriptors associated with security policy enforcement. In this instance, the descriptor selection rule can indicate that, if present in the security context entry, the descriptors indicated in the request should be selected. Otherwise, if the constructor recognizes a security policy evaluation request which does not indicate any specific descriptors, the descriptor selection rule can indicate that each of the descriptors in the actor's security context entry should be selected and communicated to the requestor (i.e., for subsequent evaluation against the security policy locally by the requestor). As another example, a descriptor selection rule for reporting requests can indicate that any descriptors included in or satisfying the reporting request which are associated with the actor ID are to be selected.

At block 607, the constructor selects descriptors in the security context entry based on the descriptor selection rule. The constructor evaluates descriptor metadata against the descriptor selection rule to determine which descriptors, if any, are pertinent to the request according to the descriptor selection rule. For example, the constructor may search the security context entry based on criteria indicated in the request, such as a timestamp. As another example, if a security policy enforcement request indicates descriptor criteria for enforcement and a subset of descriptors in the security context entry satisfies the criteria in full, this subset of descriptors is selected. The constructor may alternatively select each of the descriptors in the security context entry to fulfill a security policy enforcement request if the request does not specify descriptors or descriptor criteria. To fulfill a reporting request, descriptors which are indicated by the reporting request either explicitly and/or as part of a logical combination of descriptors can be selected. If the reporting request indicates a logical combination of descriptors, the constructor evaluates the descriptor metadata in the security context entry to determine if the security context entry contains a subset of descriptors according to the requested combination. As an example, if the reporting request indicates "Role=Analyst AND DS_Ts1 OR DS_Ts3" and the actor is an analyst and associated with DS_Ts1, the constructor selects the Role and DS_Ts1 descriptors. Descriptors may be selected, for example, by flagging or otherwise marking the descriptors during selection.

At block 609, the constructor constructs a response to the request with the selected descriptors. The constructor compiles the selected descriptors which were flagged, marked, etc. to create the response. For instance, the selected descriptors may be copied from the security context entry into a response, incorporated in a response message as a payload, etc. If no descriptors were selected due to no descriptors in the security context entry satisfying the descriptor selection rule, the constructor can construct a response indicating that the request could not be satisfied (e.g., by constructing a response with a null value, an empty set, etc.). The constructor may construct the response as each descriptor is selected or after the set of descriptors has been selected.

At block 611, the constructor communicates the response with the selected descriptors to the requestor. The response can indicate the descriptors which satisfy the request based on the request type or if the actor indicated by the actor ID was not associated with descriptors satisfying the request.

Variations

Though not depicted in FIG. 1, 2, or 5, descriptors may be removed from an actor. Removal of descriptors may be triggered by a remediating event, or an event which resolves a security concern associated with a descriptor. For instance, a descriptor attached to an actor can indicate that the actor's credentials have potentially been compromised after detecting a threshold number of failed authentication attempts. Various security components can "consume" this aspect of the actor's security context by enforcing policies upon determining that the actor's credentials are potentially compromised. However, upon remediation of this event, it may be desired that these policies are no longer applied to the actor. A remediating event which resolves this security concern can be a password reset event. After detecting a password reset event in event information retrieved from an event log, the security context constructor may remove the descriptor for potentially compromised credentials from the actor. For example, the security context constructor may remove the descriptor from the actor's security context (i.e., by removing the descriptor from the actor's security context entry in a security context repository).

The examples often refer to a "security context constructor." The security context constructor is a construct used to refer to implementation of functionality for extracting metadata from detected events for generation of descriptors to attach to actors. These constructs are utilized since numerous implementations are possible. A security context constructor may be a particular component or components of a machine (e.g., a particular circuit card enclosed in a housing with other circuit cards/boards), machine-executable program or programs, firmware, a circuit card with circuitry configured and programmed with firmware, etc. The term is used to efficiently explain content of the disclosure. Although the examples refer to operations being performed by a security context constructor, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 405 and 407 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language; a dynamic programming language; a scripting language; and conventional procedural programming languages or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
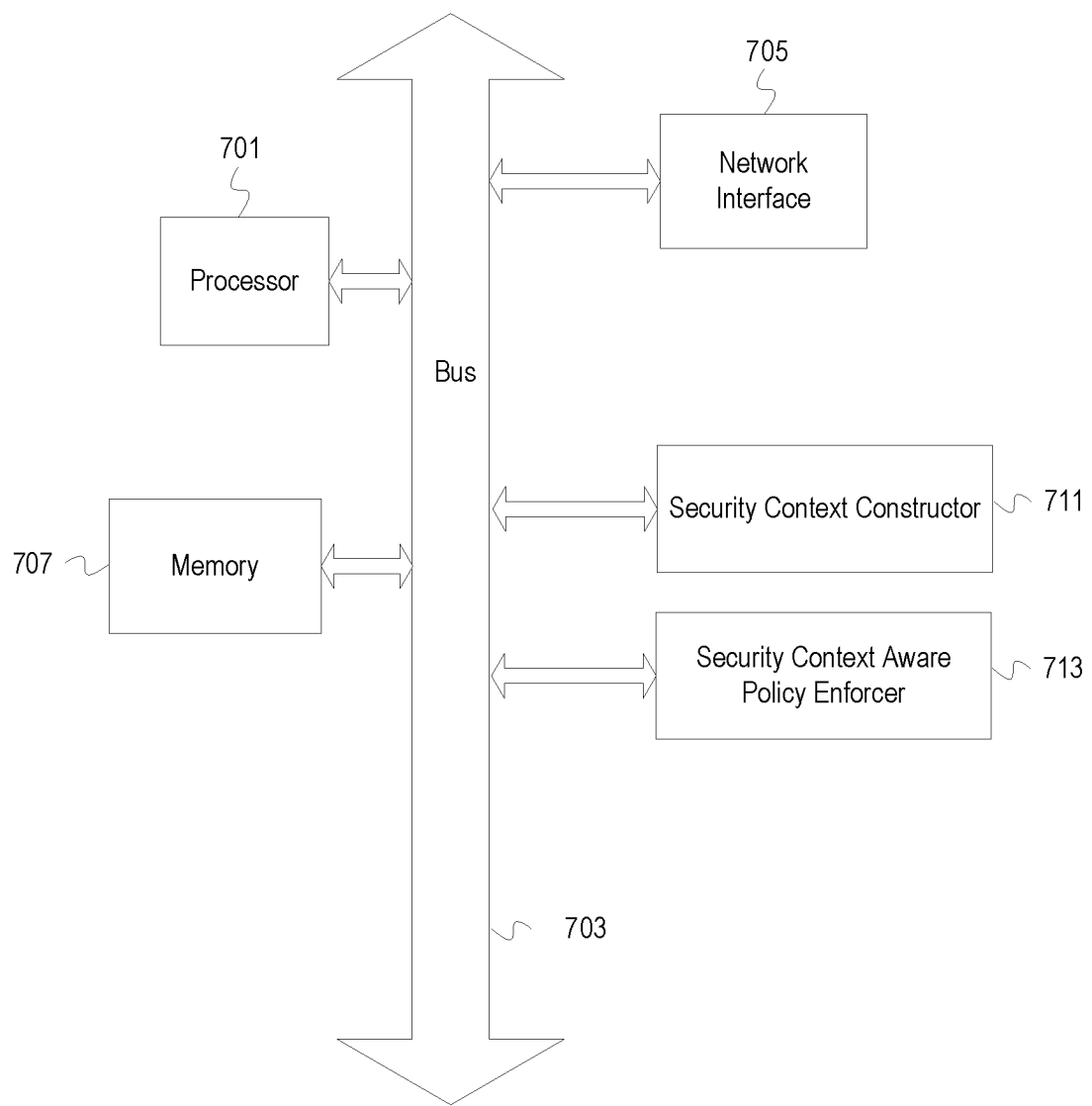
FIG. 7 depicts an example computer system with a security context constructor and a security context aware policy enforcer.

FIG. 7 depicts an example computer system with a security context constructor and a security context aware policy enforcer. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes security context constructor 711 and security context aware policy enforcer 713. The security context constructor 711 determines descriptors based on detection of an event and attaches the descriptors to an actor corresponding to the event. The security context aware policy enforcer 713 enforces security policies based on evaluation of an actor's security context. The security context constructor 711 and security context aware policy enforcer 713 do not necessarily execute on the same computer system. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for event-based creation of descriptors and enforcement of security policies based on descriptors attached to a corresponding actor as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
based on receipt of a request from a requestor that indicates an identifier of an actor,
accessing a data structure comprising a plurality of descriptors associated with the identifier of the actor, wherein the plurality of descriptors describes security related events corresponding to the actor that were previously detected by a plurality of security components of a first network associated with the actor, wherein the actor corresponds to a user or a device;
determining a type of the request
selecting a subset of the plurality of descriptors based, at least in part, on determining a rule for descriptor selection that corresponds to the type of the request;
constructing a response to the request with the selected subset of descriptors; and
communicating the response with the selected subset of descriptors to the requestor to fulfill the request.

2. The method of claim 1, wherein selecting the subset of the plurality of descriptors comprises evaluating metadata of the descriptors against the rule for descriptor selection.

3. The method of claim 1, wherein constructing the response to the request comprises incorporating the subset of the plurality of descriptors as a payload in the response.

4. The method of claim 1, wherein constructing the response to the request comprises constructing the response with an indication that the request could not be fulfilled based on the plurality of descriptors.

5. The method of claim 1, wherein the plurality of descriptors also comprises indication of at least one attribute of the actor.

6. The method of claim 1 further comprising:
based on detecting a first event in the first network, for a first security policy of the first network, determining at least a first descriptor of the subset of the plurality of descriptors associated with the actor that can be evaluated against the first security policy, wherein the request is associated with the first event;
evaluating the first descriptor against the first security policy; and
enforcing the first security policy based on the evaluating.

7. The method of claim 6 further comprising determining that the first event triggers evaluation of the first security policy.

8. The method of claim 6, wherein the first security policy is enforced by a first of the plurality of security components that detected the first event.

9. The method of claim 6, wherein determining at least a first descriptor of the subset of the plurality of descriptors that can be evaluated against the first security policy comprises evaluating a descriptor criterion of at least one of the first security policy and each security condition indicated in the first security policy against metadata of each of the subset of the plurality of descriptors.

10. The method of claim 6 further comprising determining whether the first security policy is enforced based on evaluation of descriptors, wherein accessing the data structure comprising the plurality of descriptors is based on a determination that the first security policy is enforced based on evaluation of descriptors.

11. The method of claim 1 further comprising:
generating a new descriptor based on event information of a second event in the first network; and
associating the new descriptor with the actor.

12. A non-transitory, computer-readable medium having program code stored thereon, the program code comprising machine instructions to:
based on detection of a first security related event that triggers evaluation of a first security policy, retrieve a security context of an actor corresponding to first security policy triggered by the first security related event,
wherein the security context comprises information abouta plurality of descriptors of previously detected behavior corresponding to the actor;
determine which of the plurality of descriptors of the security context can be evaluated against the first security policy based, at least in part, on the first security policy;
determine whether the determined descriptors of the security context satisfy the first security policy based, at least in part, on evaluation of the determined descriptors against the first security policy; and
based on a determination that the determined descriptors satisfy the first security policy, enforce the first security policy for the actor.

13. The non-transitory, computer-readable medium of claim 12, wherein the program code further comprises instructions to update the security context of the actor based, at least in part, on the first security related event.

14. The non-transitory, computer-readable medium of claim 13, wherein the program code further comprises instructions to generate an additional unit of information based on the first security related event, wherein the instructions to update the security context comprise at least one of instructions to include the additional unit of information in the security context and instructions to correlate the additional unit of information with at least a first of the units of information in the security context.

15. The non-transitory, computer-readable medium of claim 13 wherein the instructions to update the security context comprise instructions to update a cumulative unit of information of the security context based, at least in part, on the first security related event.

16. The non-transitory, computer-readable medium of claim 13, wherein the program code further comprises instructions to remove a unit of information from the security context based on satisfaction of a removal condition.

17. A system comprising:
a plurality of monitoring components that monitors a network and records event information about events detected by the plurality of monitoring components;
a server comprising a computer-readable medium having program code stored thereon executable by the server to cause the server to create and maintain aggregates of the event information,
wherein each of the aggregates of event information indicates aggregated event information of events per actor within the network,
wherein actors within the network correspond to devices that operate within the network; and
a plurality of security components of the network that perform security related operations on actors in the network based, at least part, on evaluation of the event information aggregates maintained by the server corresponding to the actors,
wherein at least some of the plurality of monitoring components and the plurality of security components are a same component.

18. The system of claim 17, wherein a first device of the network that hosts at least a first of the plurality of security components comprises a computer-readable medium having program code stored thereon executable by the first device to cause the first device to:
 obtain a first of the aggregates for a first actor based on detection of a security related event corresponding to the first actor;
 determine which information units of the first aggregate can be evaluated against a first security policy enforced by the first device; and
 enforce the first security policy upon the first actor based on evaluation of the determined information units of the first aggregate against the first security policy.

19. The system of claim 17, wherein the computer-readable medium of the server further has stored thereon program code to retrieve event information from a log data storage based on notification or detection of an update to the log data storage, wherein the plurality of monitoring components records event information into the log data storage.

20. The non-transitory, computer-readable medium of claim 12, wherein the instructions to determine which of the plurality of descriptors can be evaluated against the first security policy comprise instructions to determine which of the plurality of descriptors can be evaluated against the first security policy based, at least in part, on a first condition for satisfying the first security policy indicated by the first security policy.

* * * * *

UNITED STATES PATENT AND TRADEMARK OFFICE
CERTIFICATE OF CORRECTION

PATENT NO. : 11,271,970 B2
APPLICATION NO. : 16/522632
DATED : March 8, 2022
INVENTOR(S) : Jeffrey James Fitz-Gerald, Jr. and Ashwath Sreenivasa Murthy It is certified that error appears in the above-identified patent and that said Letters Patent is hereby corrected as shown below:

On the Title Page

Item (71) Applicant portion reading "Palo Alto Networks" should read --Palo Alto Networks, Inc.--

In the Claims

Column 22, Line 1, cancel the text beginning with "12. A non-transitory, computer-readable" to and ending "policy for the actor." in Column 22, Line 22, and insert the following claim:
--12. A non-transitory, computer-readable medium having program code stored thereon, the program code comprising machine instructions to:
based on detection of a first security related event that triggers evaluation of a first security policy, retrieve a security context of an actor corresponding to the first security related event,
wherein the security context comprises a plurality of descriptors of previously detected behavior corresponding to the actor;
determine which of the plurality of descriptors of the security context can be evaluated against the first security policy based, at least in part, on the first security policy;
determine whether the determined descriptors of the security context satisfy the first security policy based, at least in part, on evaluation of the determined descriptors against the first security policy; and
based on a determination that the determined descriptors satisfy the first security policy, enforce the first security policy for the actor.--

Signed and Sealed this
Twenty-sixth Day of April, 2022

Katherine Kelly Vidal
*Director of the United States Patent and Trademark Office*